United States Patent [19]
Higa et al.

[11] Patent Number: 5,978,036
[45] Date of Patent: Nov. 2, 1999

[54] CHARACTER SIGNAL PROCESSING APPARATUS AND CHARACTER SIGNAL PROCESSING SYSTEM AND PERSONAL COMPUTER

[75] Inventors: Kenzo Higa, Kanagawa; Hidetoshi Shimada, Tokyo, both of Japan

[73] Assignee: Sony Corporation, Tokyo, Japan

[21] Appl. No.: 08/807,202

[22] Filed: Feb. 28, 1997

[30] Foreign Application Priority Data

Mar. 4, 1996 [JP] Japan ................................. 8-045828

[51] Int. Cl.[6] ....................................................... H04N 7/08
[52] U.S. Cl. ......................... 348/468; 348/552; 348/725; 340/825.26
[58] Field of Search ................................. 348/552, 725, 348/473, 476, 477, 478, 479, 461, 463, 465, 467, 468; 358/142, 146, 147, 188; 340/825.26, 825.27; 364/705.05; 705/35–37; 710/102; 455/3.1, 3.2, 4.2, 6.3; H04N 7/08, 7/087, 5/44, 5/445, 5/455

[56] References Cited

U.S. PATENT DOCUMENTS 3,848,082 11/1974 Summers .
4,517,598 5/1985 Van Valkenburg et al. .
5,359,367 10/1994 Stockill ................................... 348/552

FOREIGN PATENT DOCUMENTS 306208 3/1989 European Pat. Off. ....... H04N 7/087
491068 6/1992 European Pat. Off. ......... H04N 7/08
62-245744 10/1987 Japan ..................................... 358/142
04373284 12/1992 Japan .
05328320 12/1993 Japan .
07075072 3/1995 Japan .
07177478 7/1995 Japan .
07322224 12/1995 Japan .
2149277 6/1985 United Kingdom .

OTHER PUBLICATIONS

Hedger, John, "Broadcast Telesoftware: Experience with Oracle", 1980 by Online conference Ltd.

Givertz, M.J. "Practical Implementation Of an Information Provision Service Using Teletext", Conference on Electronic Delivery of Data and Software, The Cavendish Conference Centre, London, Sep. 16–17, 1986.

Primary Examiner—David E. Harvey
Attorney, Agent, or Firm—Jay H. Maioli

[57] ABSTRACT

A personal computer receives a teletext signal. A television broadcast signal received by a TV tuner unit is converted to a composite video signal and a voice signal and are then supplied to a personal computer card. The personal computer card extracts character data with a character data extracting circuit when the input composite video signal is a teletext signal and converts such character data to the code data and supplies the code data to the personal computer for display on a liquid crystal display. Moreover, when the composite video signal is a television broadcast signal, it is converted to a digital signal with a video decoder and is then supplied to the personal computer for output to the liquid crystal display.

10 Claims, 10 Drawing Sheets

| FIG. 3A | FIG. 3B |

FIG. 4

STOCK MARKET SITUATION

| STOCK NAME | AMOUNT OF SALES | NET CHANGE |
|---|---|---|
| N & N | 526.30 | +20.15 |
| J P W | 284.12 | +18.17 |
| T R A P U L E T | 981.15 | 0 |
| S K T | 781.22 | +28.01 |
| K & B | 1821.50 | 0 |
| S H N I D E R | 100.20 | −123.00 |
| D U P O M | 99.30 | −100.99 |

FIG. 5

STOCK PRICE RETRIEVAL

STOCK NAME: >　P & S

AMOUNT OF SALES: 728.60

NET CHANGE: +26.30

CHARACTER SIGNAL PROCESSING APPARATUS AND CHARACTER SIGNAL PROCESSING SYSTEM AND PERSONAL COMPUTER

FIELD OF THE INVENTION

The present invention relates to a character signal processing apparatus, a character signal processing system and a personal computer and more particularly to an apparatus and a system for reproducing the teletext with a personal computer.

BACKGROUND OF THE INVENTION

In recent years, rapid development of information in society has brought about wide spread use of personal computers as an ordinary home appliance.

These personal computers can be used through connection with a variety of kinds of information apparatus. For example, it can transmit or receive facsimile data through connection with the telephone line and can receive a television signal through connection with a tuner for receiving the television signal.

Here, as a part of the television broadcast, the so-called teletext has been implemented by transmitting a program of the stationary image formed of characters and figures superimposed to a part of the broadcast signal.

In the teletext, the characters such as KANA and Chinese Characters of Japanese language (data for which bit pattern indicated on the display screen is previously determined) are transmitted as the code data and the code data having been transmitted is converted in the receiving side into the bit pattern for display on the screen before it is displayed. Therefore, in the receiving side, ROM (Read only Memory) for storing bit pattern of characters transmitted, CPU (Central Processing Unit) for retrieving characters stored and RAM (Random Access Memory) are required.

Accordingly, in order to receive the teletext signal with a television receiver not provided with a function to receive the teletext signal (receiver which can receive only the television broadcast signal), ROM, CPU, RAM and a circuit including a superimposing circuit to superimpose the teletext signal into the video signal (image signal) are required additionally. Various kinds of circuits having such function have been developed as the teletext signal receiving circuit.

Applied use of this teletext signal receiving circuit allows a personal computer to receive the teletext signal. Namely, a personal computer can be used as a new type information source. However, such a personal computer is not yet announced for the public. Described below is a PC (Personal Computer) card simply comprising the teletext receiving circuit explained above but such PC card does not yet exist actually.

Figure 7:
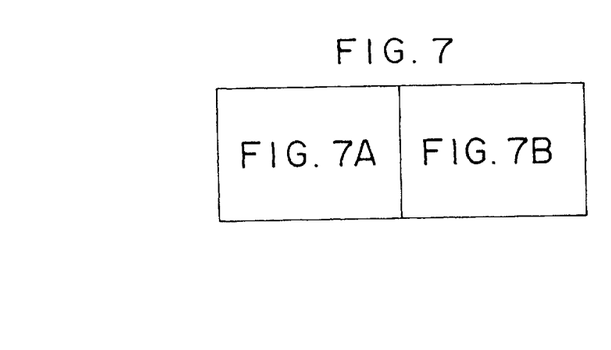
FIG. 7 is a diagram showing a structural example of the teletext signal receiving system by a personal computer.
Figure 7A:
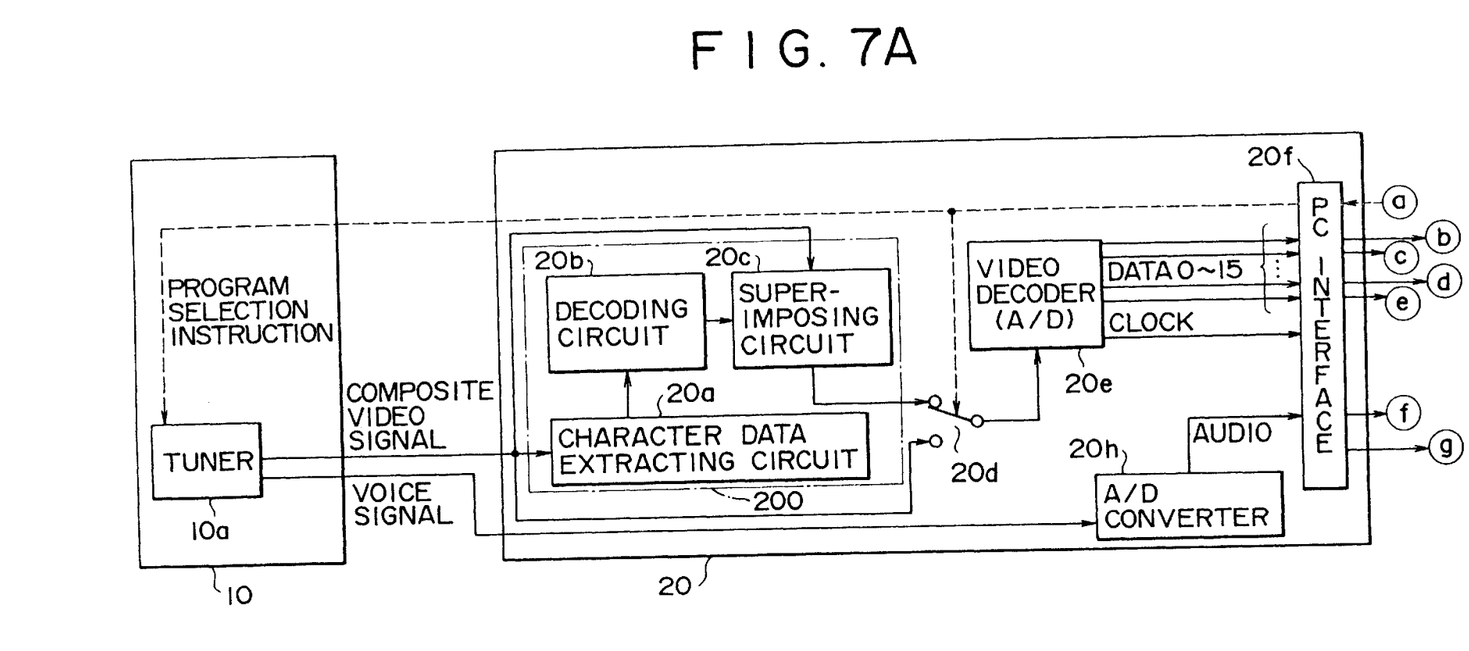
Figure 7B:
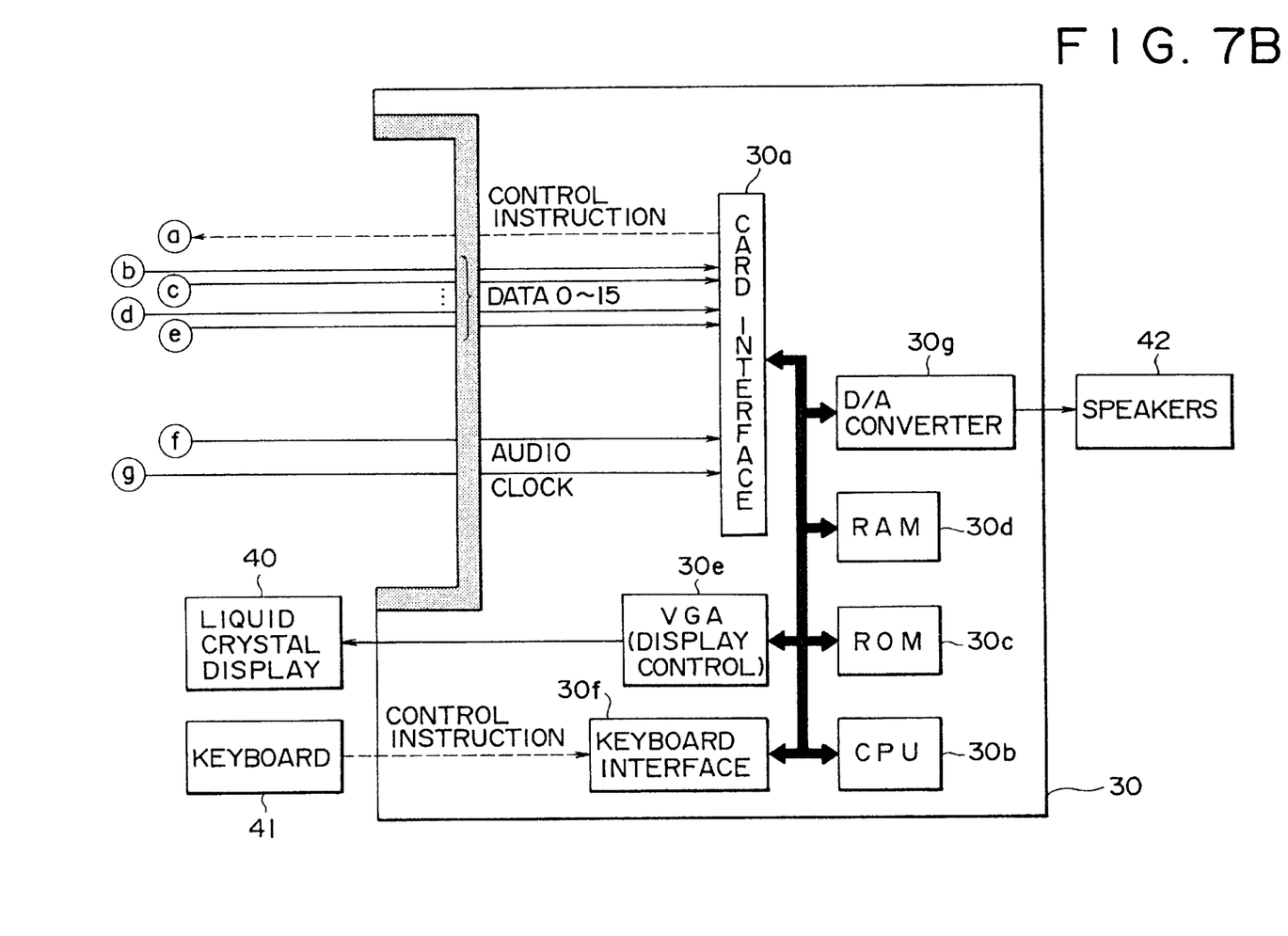

FIG. 7 is a block diagram showing an example of structure of a conventional PC card comprising in direct the teletext signal receiving circuit explained above.

In this figure, a TV tuner unit 10 is composed of a tuner 10a and used as one of the peripheral circuits of a personal computer 30. The PC card 20 is composed of a teletext signal receiving circuit 200 (comprising a character data extracting circuit 20a, a decoding circuit 20b and a superimposing circuit 20c), a video decoder 20e, PC interface 20f and an A/D converter 20h and is loaded to an extension slot of the personal computer 30.

The personal computer 30 is composed of a card interface 30a, CPU 30b, ROM 30c, RAM 30d, VGA (Video Graphics Array) 30e, a keyboard interface 30f and a D/A converter 30g, etc. At its external side, a CRT (Cathode Ray Tube) display 40, a keyboard 41 and loud speakers 42 are connected.

In above structure, when an operator (viewer) operates the keyboard 41 to select the predetermined channel (broadcasting station), CPU 30b of the personal computer 30 obtains the data of broadcasting station selected by the operator via the keyboard interface 30f. CPU 30b supplies a control instruction to receive the information of the broadcasting station inputted by the operator to the TV tuner unit 10 and PC card 20 via the card interface 30a.

The TV tuner unit 10 receives the broadcast signal of the predetermined broadcasting station on the basis of the selection instruction supplied from the personal computer 30 and converts this broadcast signal into a composite video signal and a voice signal before these are outputted to the PC card 20.

The teletext signal receiving circuit 200 of the PC card 20 extracts the teletext signal superimposed on the composite video signal and outputs this teletext signal after the superimposing process as required with respect to the video signal. Namely, the character data extracting circuit 20a of the teletext signal receiving circuit 200 extracts character data included in the teletext signal superimposed in the vertical blanking period of the composite video signal and then supplies this character data to a decoding circuit 20b. The decoding circuit 20b retrieves, from ROM not illustrated, the bit pattern for display on the display screen corresponding to individual character data and outputs such bit pattern to the superimposing circuit 20c. The superimposing circuit 20c superimposes the bit pattern of characters outputted from the decoding circuit 20b and the composite video signal and outputs the superimposed signal, when the teletext signal selected by the operator is, for example, the superimposed dialog broadcast signal (broadcast signal where dialogs are displayed as character string at a part of the display screen) for the convenience of persons having handicap in the sense of hearing. Moreover, when the selected teletext signal is the ordinary teletext signal (broadcast signal consisting of only characters), the superimposing circuit 20c does not execute the superimposing process and outputs in direct the bit pattern transmitted from the decoding circuit 20b.

The decoding circuit 20b is also provided, as explained above, with CPU, ROM and RAM (not illustrated) for retrieving the bit pattern of characters corresponding to the code data transmitted from the transmitting side.

A selector 20d selects, when the broadcast selected by the operator is the teletext signal, an output signal of the superimposing circuit 20c and also selects, when the broadcast is the ordinary television signal, an output signal of the TV tuner unit 10 and outputs this signal to a video decoder 20e.

The video decoder 20e converts the input video signal (analog signal) to a digital signal through the A/D conversion and outputs this digital signal to a PC interface 20f as the digital signal of YUV 4:2:2 format (hereinafter referred to as the video data). The PC interface 20f supplies the input video data to the card interface 30a of the personal computer 30 via a buffer, etc. not illustrated.

An A/D converter 20h converts the input voice signal to digital data through the PCM system and supplies this digital data to the PC interface 20f as an audio data. The PC interface 20f supplies the input audio data to the card interface 30a of the personal computer 30 via the buffer, etc. not illustrated.

The video data inputted to the card interface 30a is supplied to VGA 30e via the bus for execution of the predetermined process and is then displayed on the CRT display 40. Moreover, the audio data is supplied to a D/A converter 30g via the card interface 30a for conversion into an analog audio signal. Thereafter this analog audio signal is supplied to loud speakers 42 and are then outputted as the audible voice data.

According to such example, the teletext signal can be received by means of the personal computer 30 utilizing an existing teletext signal receiving circuit 200.

As explained above, the decoding circuit 20b of the teletext signal receiving circuit 200 is provided with semiconductor devices such as ROM for storing the bit pattern for display on the screen, CPU for retrieving the bit pattern stored and RAM. These semiconductor devices are also mounted in the personal computer 30, resulting in the problem that the devices are duplicated and thereby the cost of the system as a whole becomes high and system size is also increased.

The character data extracted from the teletext signal is converted to the video signal in the PC card 20 and is then outputted. Therefore, the personal computer 30 has a problem that it cannot process the character data included in the teletext signal in the same manner as the character data (character code) processed therein.

SUMMARY OF THE INVENTION

The present invention has been proposed considering the background explained above. Namely, according to the present invention, the teletext signal can be received easily with a personal computer 30 and the character data included in the teletext signal received can be processed in the same manner as the character data (character code) processed within the personal computer 30.

The character signal processing apparatus of the present invention is provided for processing character signals multiplexed in the broadcast signal and is characterized in comprising input means for inputting a broadcast signal, extracting means for extracting character signals from the input broadcast signal using the predetermined first clock signal and outputting the extracted character data and the first clock signal and interface means for outputting the character data and the first clock signal outputted from the extracting means to the personal computer.

The character signal processing system of the present invention is characterized in comprising a card including the circuit for processing character signals transmitted as the multiplex signal with the broad cast signal and a personal computer loading such card, wherein the card is composed of inputting means for inputting the broadcast signal, extracting means for extracting the broadcast signal character signal from the input broadcast signal using the predetermined first clock signal and outputting the extracted character data and the first clock signal and first interface means for outputting the character data and first clock signal outputted from the extracting means to a personal computer, while the personal computer is composed of a second interface connected to the first interface when the card is loaded, a display signal generating means connected to the second interface via a bus to generate a character display signal corresponding to the character data transmitted from the card, a central processing unit (CPU) connected to a bus to control the display signal generating means and display means connected to the display signal generating means to display characters depending on the character display signal.

The personal computer of the present invention is provided for processing character signals transmitted as the multiplex signal with the broadcast signal and is characterized is comprising a card interface, to which a card including an input terminal for inputting the broadcast signal, an extracting circuit for extracting the character signal from the input broadcast signal using the predetermined first clock signal and outputting the character data and first clock signal outputted from the extracting circuit and an interface circuit for outputting the character data and the first clock signal outputted from the extracting circuit is loaded, display signal generating means connected to the card interface via a bus to generate the character display signal corresponding to the character data transmitted from the card, a central processing unit (CPU) connected to a bus to control the card and display signal generating means and display means connected to the display signal generating means to display characters depending on the character display signal.

BRIEF DESCRIPTION OF THE DRAWINGS

Other objects and advantages of the present invention will be apparent from the following detailed description of the presently preferred embodiment thereof, which description should be considered in conjunction with the accompanying drawings in which.

DESCRIPTION OF THE PREFERRED EMBODIMENT

Figure 1:
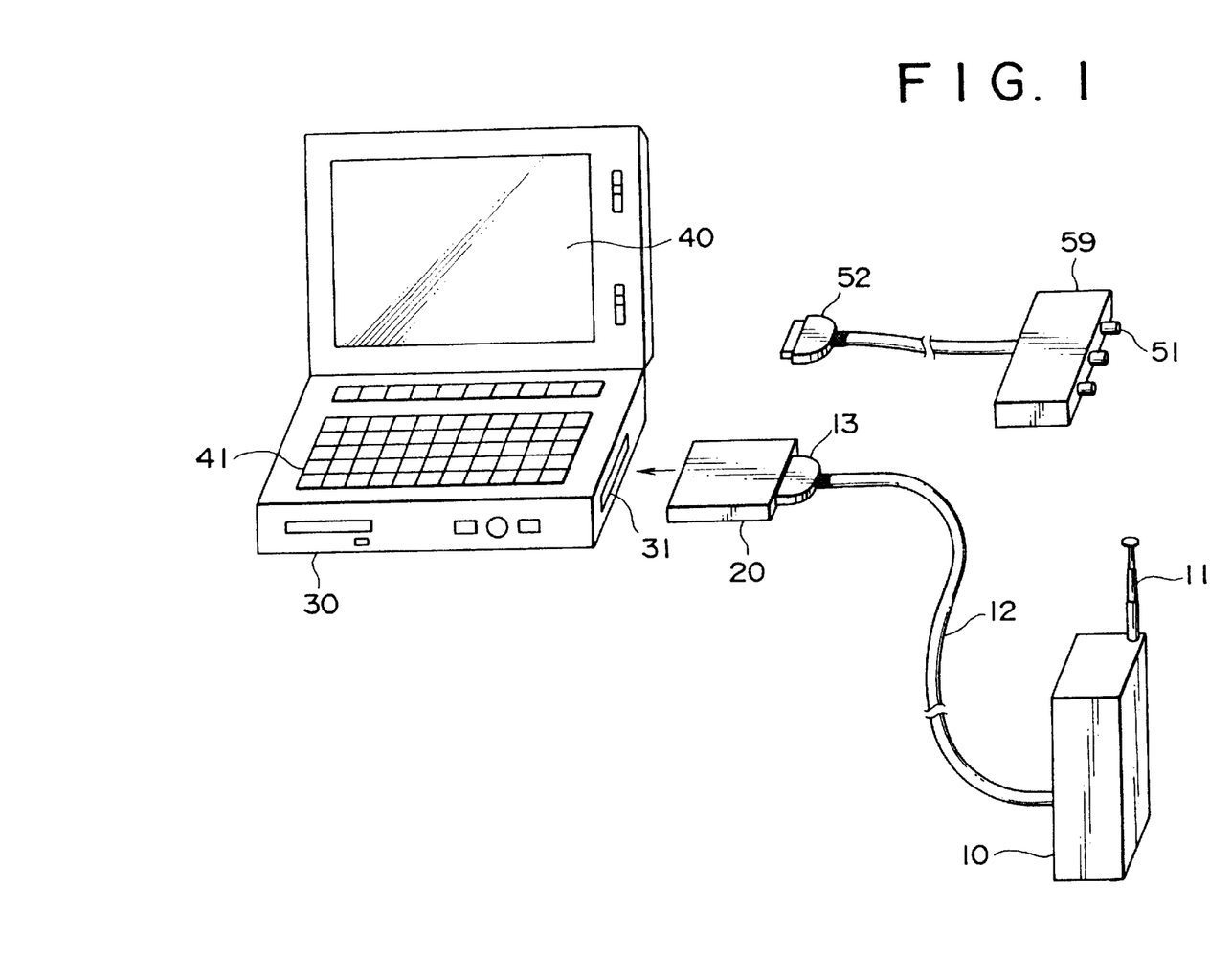
FIG. 1 is a diagram showing an example of structure of the teletext signal receiving system to which the extracting apparatus of the present invention is applied.

FIG. 1 is a diagram showing an example of the structure of the teletext signal receiving system to which the extracting apparatus of the present invention is applied. In this figure, the TV tuner unit 10 converts the signal including both ordinary television signal and teletext signal received by an antenna 11 into a composite video signal and a voice signal and outputs these signals to the PC card 20 via an output cable 12 and a connector 13.

The PC card 20 is structured to be freely loaded or unloaded to or from the extension slot 31 of the personal computer 30. This PC card 20 receives as an input the teletext signal or television signal and converts this input signal into the digital signal and then supplies the digital signal to the personal computer 30.

The personal computer 30 superimposes bit pattern of characters to the video data supplied from the PC card 20 for display on the liquid crystal display 40 and also converts the audio data by the D/A conversion method to output it from the loud speakers 42 as the audible voice output data. Moreover, the keyboard 41 is operated to select the receiving channel.

Since the PC card 20 is also compatible with the specifications of the output signal of a video capture 50 for inputting the video signal to the personal computer 30, it is possible, by exchanging the connector 52, to convert the video signal inputted from the video input terminal 51 into the digital signal with the PC card 20 to input the digital signal to the personal computer 30.

In FIG. 1, a Lap Top type computer has been used as the personal computer 30, but a Desk Top type computer can naturally be used.

Figure 2:
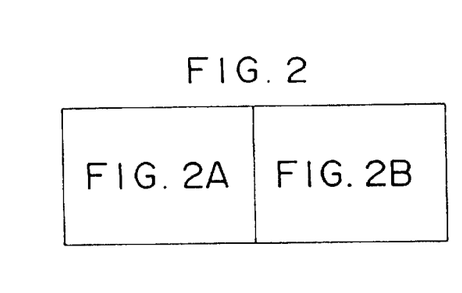
FIG. 2 is a block diagram showing the connecting condition when the teletext signal is being received in the embodiment shown in FIG. 1.
Figure 2A:
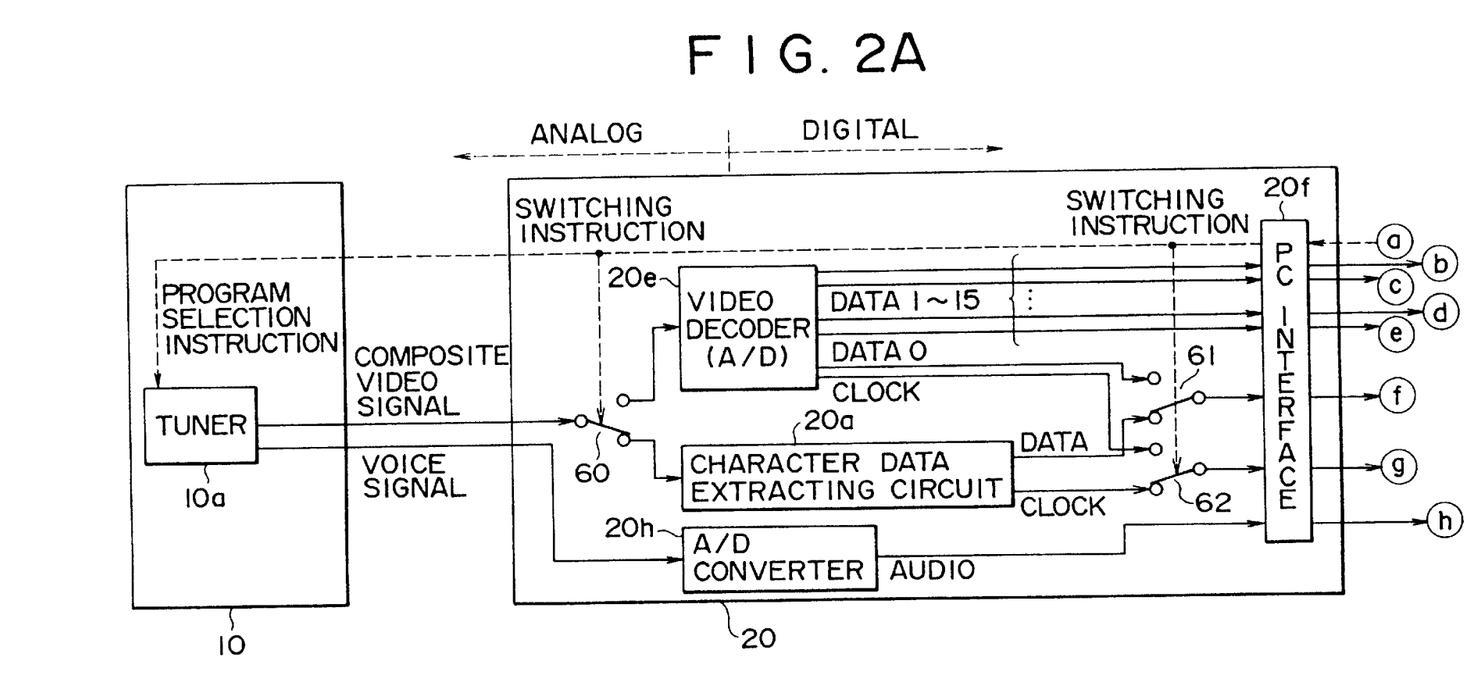
Figure 2B:
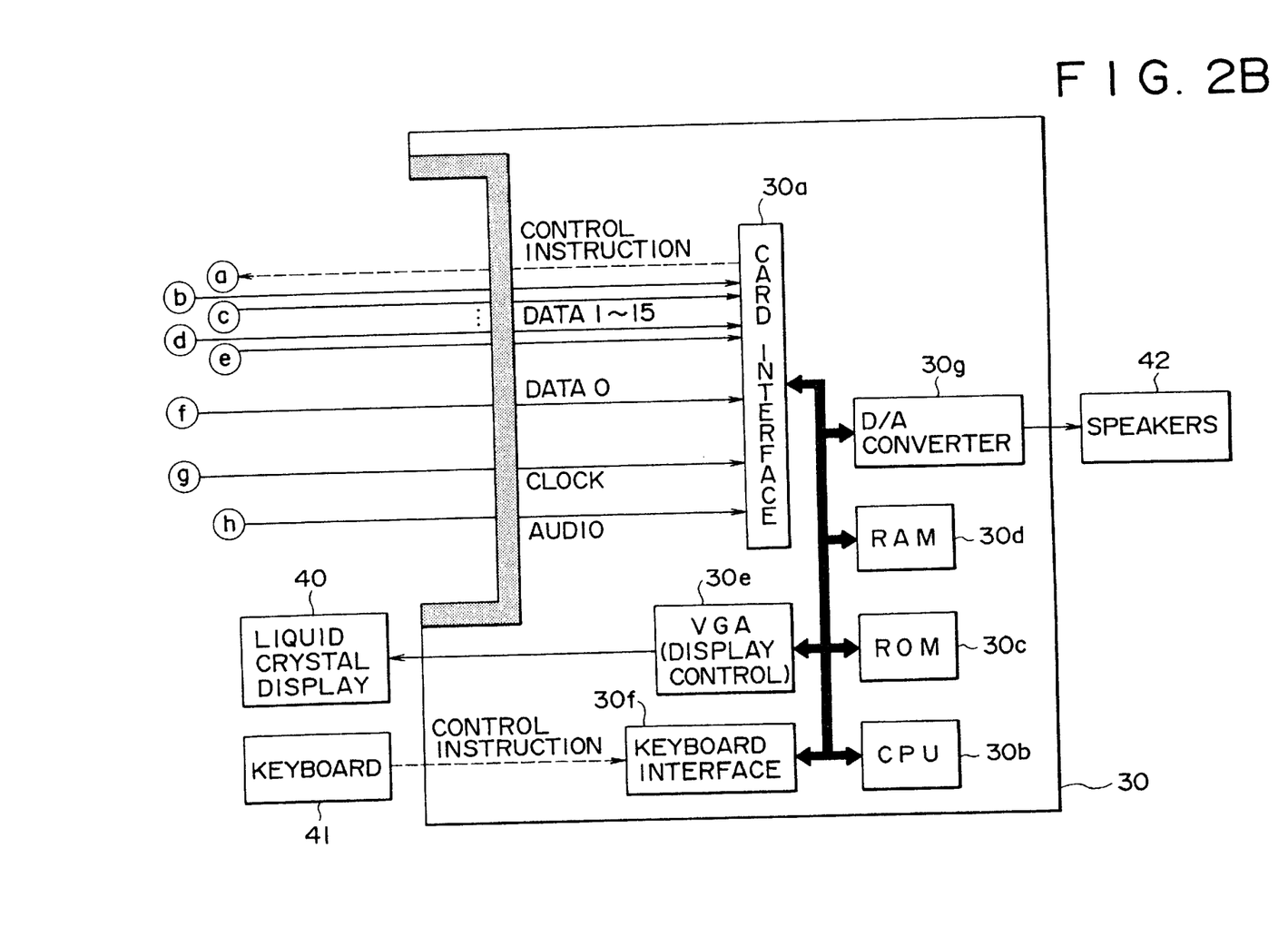
Figure 3:
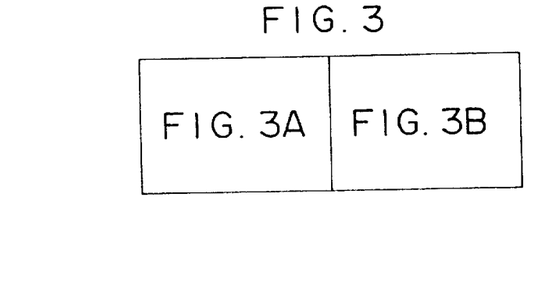
FIG. 3 is a block diagram showing the connecting condition when the television signal is being received in the embodiment shown in FIG. 1.
Figure 3A:
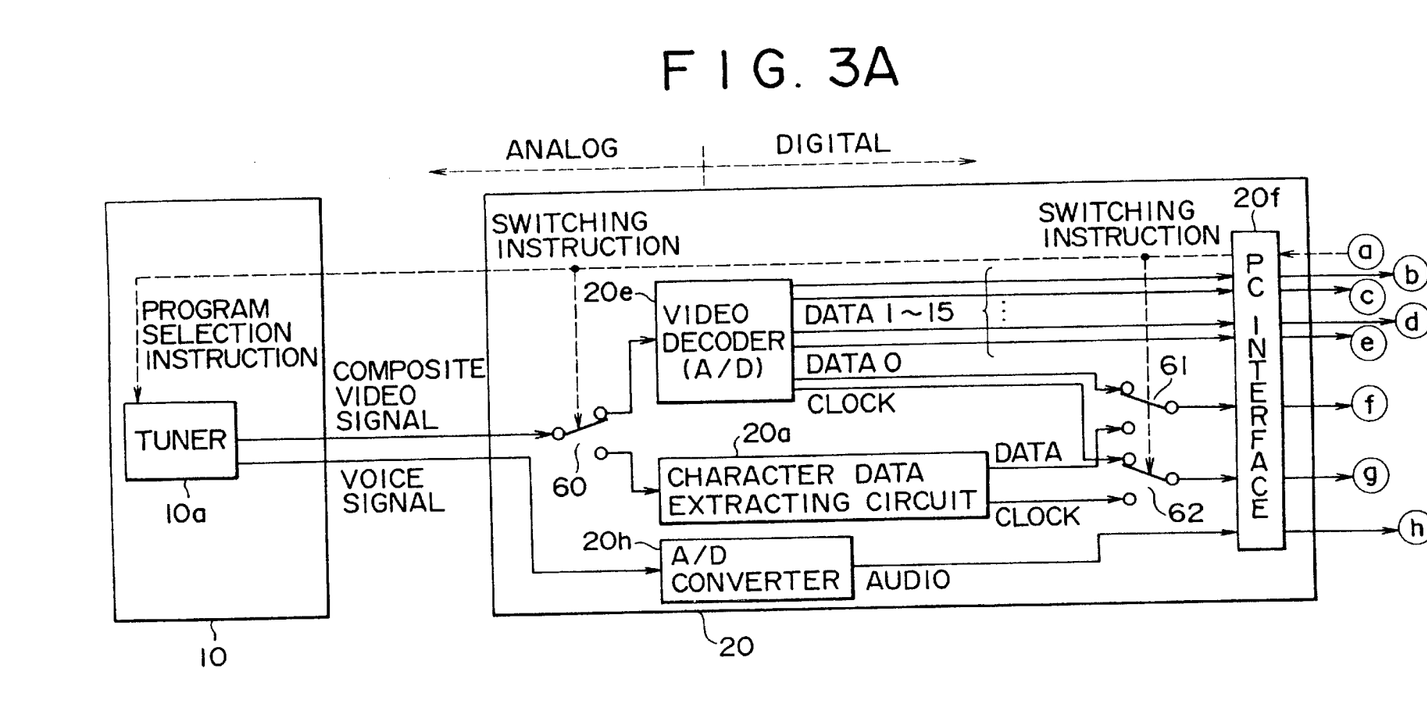
Figure 3B:
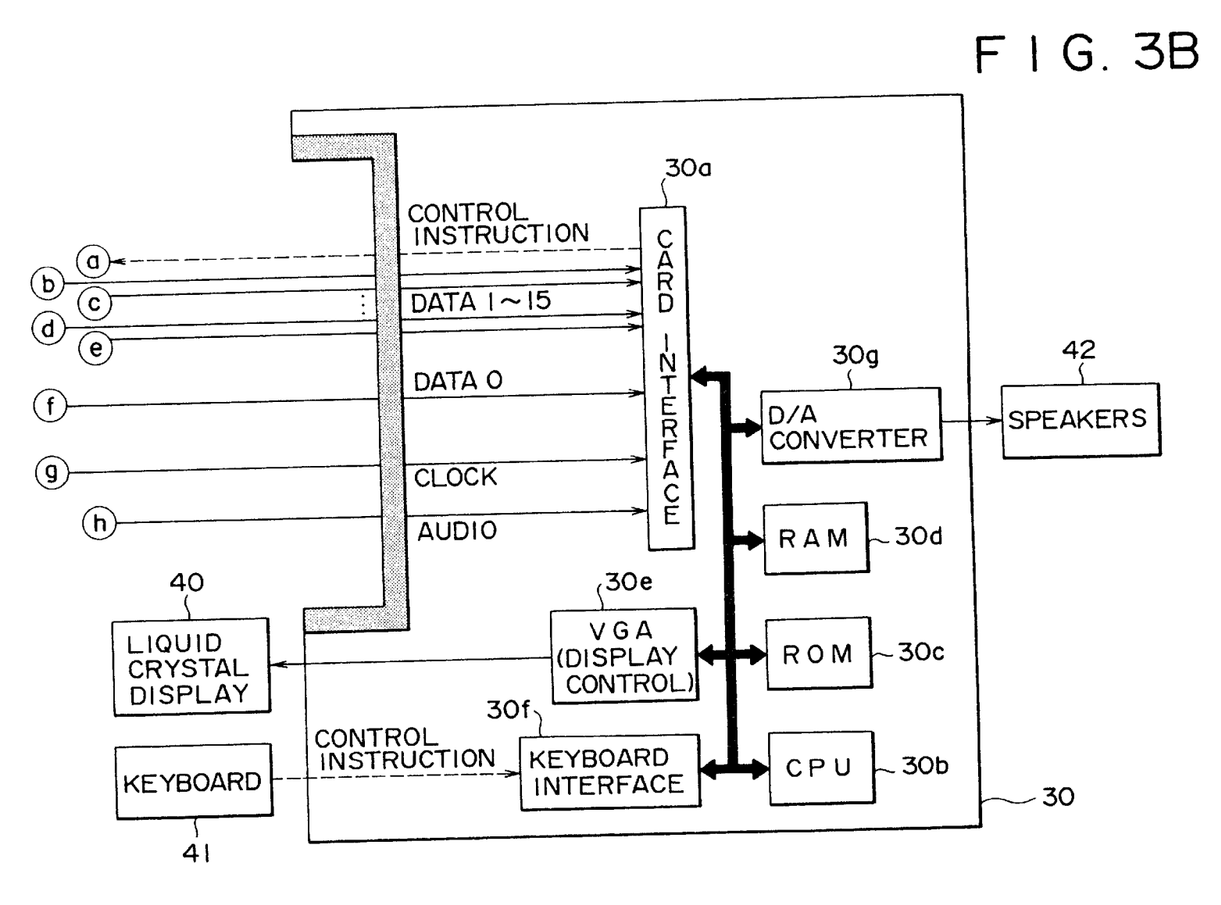

FIG. 2 and FIG. 3 are block diagrams showing examples of electrical structures of the embodiment shown in FIG. 1. In these figures, the elements like those in FIG. 7 are designated by the like reference numerals and the same explanation is not repeated here. FIG. 2 shows the connecting condition when the teletext signal is being received, while FIG. 3 shows the connecting condition when the television signal is being received.

In FIG. 2 and FIG. 3, the TV tuner unit 10 and personal computer 30 are structured in the same manner as those in FIG. 7.

The TV tuner unit 10 receives the desired broadcast signal conforming to a selection instruction from the personal computer 30 and converts this signal into the composite video signal and voice signal, before it is outputted.

The PC card 20 is composed of a selector 60 (input means), a selector 61 (selecting means), a selector 62 (selecting means), a character data extracting means 20a (teletext signal extracting means, code data converting means), a video decoder 20e (television signal extracting means, digital data converting means), a PC interface 20f (output means) and an AID converter 20h.

This PC card 20 extracts, when an operator has selected the teletext signal (shown in FIG. 2), the character data from the composite video signal with the character data extracting circuit 20a and outputs this character data to the personal computer 30, for example, as the serial data (cod e data) of 8 bits.

When an operator has selected the television signal (shown FIG. 3), the PC card 20 converts the video signal of the television signal to the video data (digital data) of YUV 4:2:2 format with the video decoder 20e and then outputs this digital signal to the personal computer 30. The A/D converter 20h converts the voice signal supplied to the digital signal with the PCM system and outputs the digital signal to the personal computer 30 as the audio data.

The personal computer 30 supplies the program selection instruction to the TV tuner unit 10 based on the control instruction inputted by the operator through the keyboard 41 and also supplies a switching instruction to the selectors 60 to 62 to receive the desired broadcast signal. The video data and audio data obtained as a result of reception is in turn inputted to the personal computer 30 via the card interface 30a. The input video data is supplied to VGA 30e and is rendered the predetermined process and thereafter it is displayed on the liquid crystal display 40. Moreover, the audio data is supplied to the D/A converter 30g for the purpose of D/A conversion and it is thereafter supplied to the loud speakers 42 before it is outputted as the audible voice data.

Next, operations of the embodiment explained above will be explained. First, operations for receiving the teletext signal will be explained with reference to FIG. 2. Subsequently, operations for receiving the television signal will be explained with reference to FIG. 3.

When an operator has operated the keyboard 41 of the personal computer 30 to input a control instruction meaning the reception of the predetermined program of the teletext, this control instruction is then supplied to CPU 30b via the keyboard interface 30f. CPU 30b outputs, on the basis of this control instruction, both program selection instruction of the predetermined program of the teletext and a switching instruction (control instruction) via the card interface 30a.

The PC interface 20f, to which the program selection instruction and switching instruction are inputted from CPU 30b, supplies the program selection instruction to the TV tuner unit 10 and outputs the switching instruction to the selectors 60 to 62 to change the connecting condition to the selectors 60 to 62 to the character data extracting circuit 20a.

The TV tuner unit 10 receives the desired program on the basis of the program selection instruction, then converts this program signal into the composite video signal and thereafter outputs the video signal to the character data extracting circuit 20a via the selector 60.

From the composite signal (video signal including the teletext signal) which has been inputted to the character data extracting circuit 20a, the character data is extracted using the clock signal of 5.727272 MHz as the reference clock, it is then converted, for example, to the serial data (code data) of 8 bits and supplied to the selector 61. Moreover, the internal clock signal of 5.727272 MHz is supplied to the selector 52 in the same manner.

Since the selectors 61 and 62 are connected to the side of the character data extracting circuit 20a (in the connecting condition shown in FIG. 2), the clock signal of 5.727272 MHz is supplied to the PC interface 20f via the signal line (DATA or CLOCK shown in FIG. 2).

The PC interface 20f outputs the data and clock signals outputted from the character data extracting circuit 20a to the card interface 30a via the buffer, etc. not illustrated.

The card interface 30a reads character data (code data) in synchronization with the clock signal and then supplies this data to VGA 30e via a bus. VGA 30e develops the character data into a bit pattern and thereafter superimposes the pattern with the other video signal as required and outputs the video signal obtained to the liquid crystal display 40 for the purpose of display.

With reference to FIG. 3, operations for receiving the television signal will then be explained.

When an operator operates the keyboard 41 to input a control instruction meaning reception of the predetermined program of the television broadcast signal, this control instruction is supplied to CPU 30b via the keyboard interface 30f as in the case explained above. CPU 30b outputs, based on this control instruction, the program selection instruction of the predetermined program of the television broadcast signal and the switching instruction (control instruction) via the card interface 30a.

The CP interface 20f, to which the program selection instruction and switching instruction are inputted, supplies the program selection instruction to the TV tuner unit 10 and outputs the switching instruction to the selectors 60 to 62 to change the connection to the video decoder 20e from the selectors 60 to 62 as shown in FIG. 3.

The TV tuner unit 10 receives, based on the program selection instruction supplied from the PC interface 20f, the desired program signal and then converts this signal into the composite video signal to output it to the video decoder 20e via the selector 60.

The composite signal (television broadcast signal) inputted to the video decoder 20e is sampled by the sampling frequency of 13.5 MHz conforming to the digital video format ITU-R (International Telecommunications Union Radio Communication Sector (former CCIR)) recommendation 601 to become the video data (digital data) of YUV 4:2:2 format. The video data obtained is supplied, as the parallel data, to the PC interface 20f via the signal lines (DATA 0 to DATA 15). Here, LSB (Least Significant Bit) of the output data is inputted to the selector 61 and the clock signal for sampling is inputted to the selector 62 and thereafter these are then supplied respectively to the PC interface 20f.

Moreover, the voice signal outputted from the TV tuner unit 10 is supplied to the A/D converter 20h. This A/D converter 20h converts the input voice signal to the digital data by the PCM system and then supplies the digital data obtained to the PC interface 20f as the audio data.

The PC interface 20f outputs the video data, audio data and clock signal outputted from the video decoder 20e to the card interface 30a via the buffer, etc. not illustrated.

The card interface 30a reads the video data and audio data in synchronously with the clock signal. The video data is then inputted to VGA 30e via the bus and is then rendered the superimposing process as required with the other video data. Thereafter, it is supplied to and displayed on the liquid crystal display 40. Moreover, the audio data is inputted to the D/A converter 30g via the bus for the purpose of D/A conversion and is then supplied to the loud speakers 42 to become the audible voice output data.

For example, when it is requested to receive a program like the superimposed dialog signal where the character data of teletext is superimposed and displayed on the television broadcast program, such request can be realized by connecting the selector 60 to both character data extracting circuit 20a and video decoder 20e, alternately transmitting the character data (code data) outputted from the character data extracting circuit 20a and the video data outputted from the video decoder 20e via the PC interface 20f and superimposing these data with each other in VGA 30e for displaying these signals on the liquid crystal display 40. In this case, connections of the selectors 61 and 62 are changed synchronously with the timings for transmitting the video data or character data.

In above structure, the character data extracted from the teletext signal is converted to the serial signal of 8 bits and is then inputted in direct to the personal computer 30. If the character data (code data) included in the teletext signal is different from the code system of character data (character code) processed in the personal computer 30, the tables corresponding to these two code systems are prepared and code conversion is necessary. That is, for example, the corresponding tables of these two code systems are stored in the hard disk apparatus not illustrated of the personal computer 30 and the code data of the teletext signal inputted from the card interface 30a is converted to the character code used within the personal computer 30.

Figure 4:
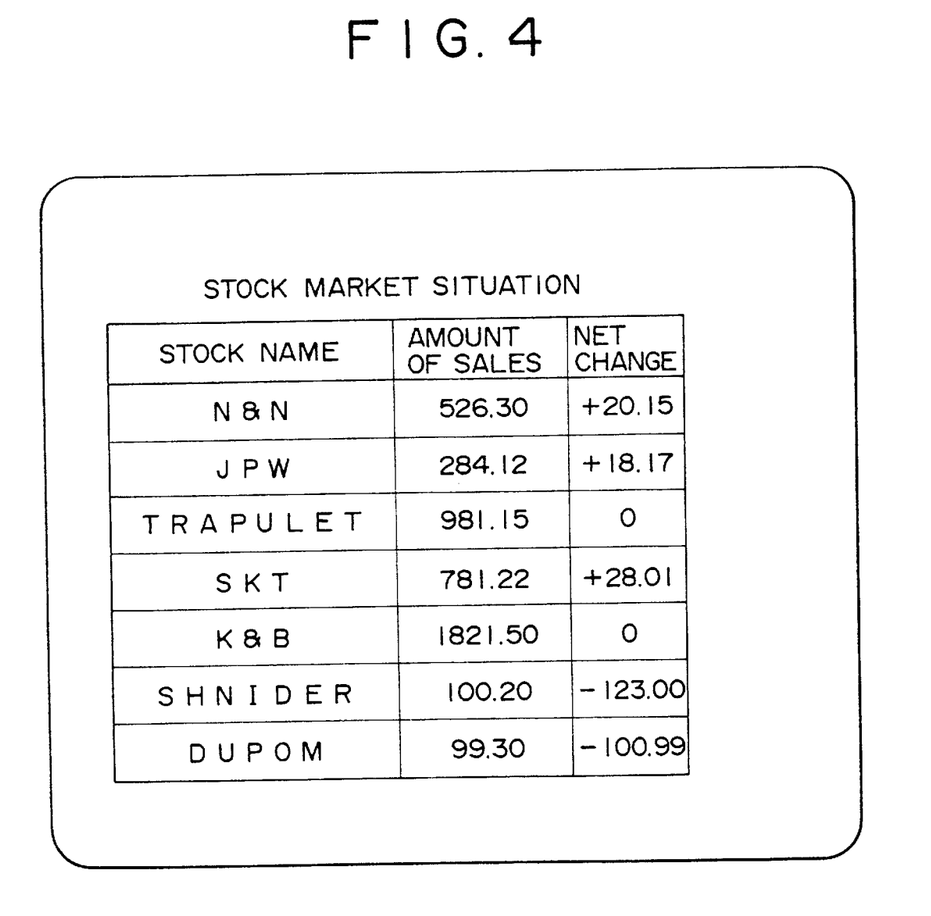
FIG. 4 is a diagram showing a display example of the teletext signal in the embodiment of FIG. 1.

FIG. 4 shows an example of display of the teletext signal in the embodiment of the present invention. In this example, a stock market situation is displayed, including the amount of sales of each stock name on that day (trading volume) and change in amount of sales of each stock name on that day and the previous day (net change in amount of sales).

The display of FIG. 4 can also be realized with the structure of the related art shown in FIG. 7. However, when the teletext signal is received in the example of the related art, the data inputted to the personal computer 30 is the video signal. Therefore, it is impossible to process the character data included in the teletext signal in the same manner as the character data (character code) processed in the personal computer 30. However, in the case of this embodiment, the character data outputted from the PC card 20 is the code data. Therefore, the personal computer 30 is capable of processing these character codes in the same manner as the character codes processed therein. A practical example of such process will be explained below.

Figure 5:
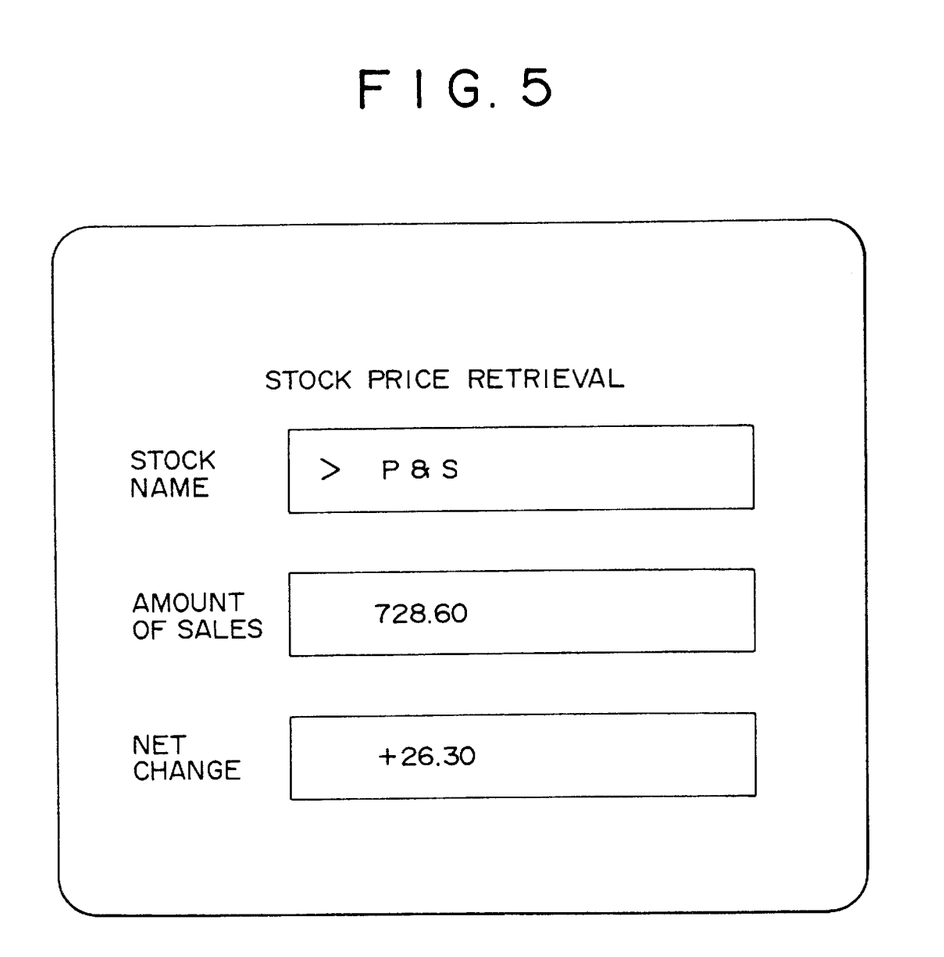
FIG. 5 is a diagram showing a display example of the character data obtained from the teletext signal in the embodiment of FIG. 1.

FIG. 5 shows the other display example in the embodiment shown in FIG. 1 and FIG. 2. This figure shows a display example for retrieving the stock price. According to the embodiment shown in FIG. 1 or FIG. 2, since the character data included in the teletext signal can be processed in the same manner as the character data processed in the personal computer 30, the desired data can be retrieved, for example, from the data of stock prices included in the stock market situation shown in FIG. 4.

In the display example of FIG. 5, a stock name (retrieval item) is inputted and the data including amount of sales and net change obtained as a result of retrieval is displayed. Namely, the stock name "P&S" is inputted as the retrieval item and the amount of sales "728.60" and net change "+26.30" are displayed as the retrieval result. Such display can be executed by once storing the data of the stock market situation outputted from the PC card 20 into RAM 30d and then retrieving the desired data for display using the software for retrieval.

Figure 6:
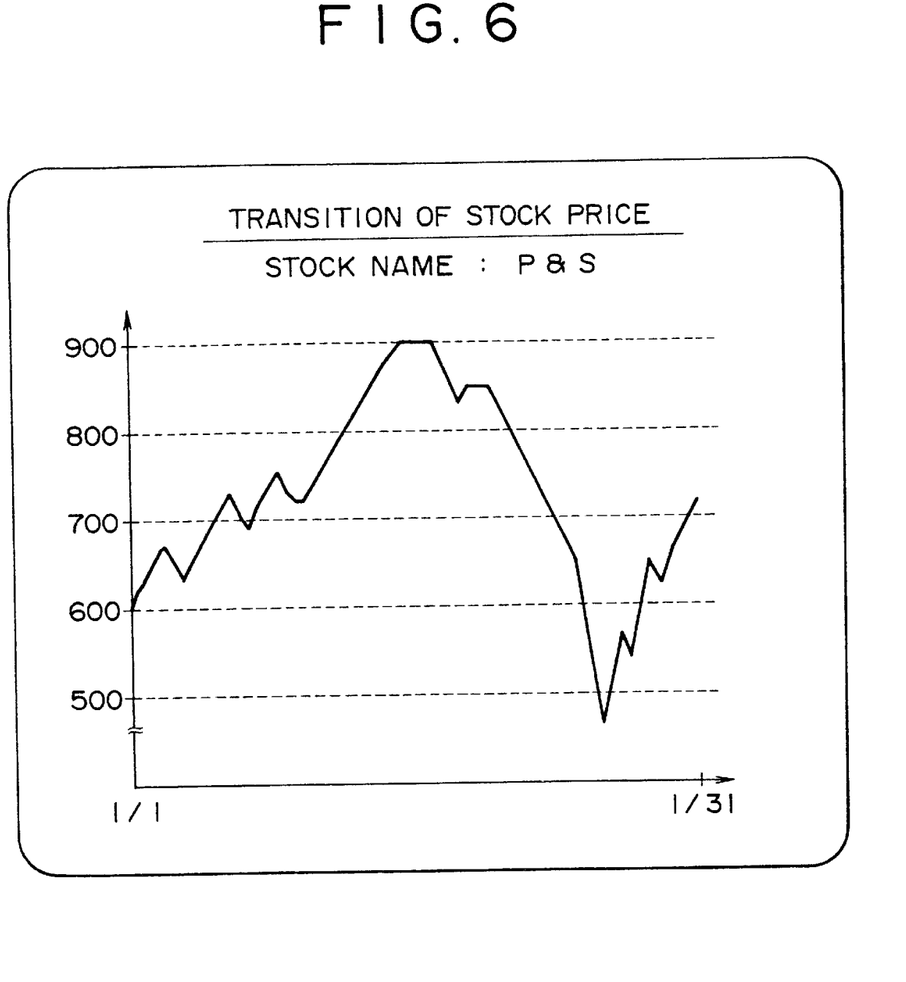
FIG. 6 is a diagram showing the other display example of the character data obtained from the teletext signal in the embodiment of FIG. 1.

FIG. 6 shows the other display example by the embodiment shown in FIG. 1 or FIG. 2. In this example, the graph indicating transition of stock price of the stock name "P&S" during January (from January 1 to January 31) is displayed. Display of such graph can be executed by storing the data of stock market situation transmitted every day as the teletext signal to the hard disk apparatus not illustrated of the personal computer 30 and processing the data stored using the software for generating the graph.

In above embodiment, the teletext signal is assumed to include only character data but the similar process can naturally be realized even when the teletext signal includes, for example, bit patterns of figures in addition to the character data. Moreover, the teletext where the character data is multiplexed on the television signal has been explained above, but the present invention can also be applied to the FM teletext where the character data is multiplexed on the FM broadcast signal.

According to the present invention, the extracted signal is converted into the code data corresponding to the character code used in the processing apparatus and is then outputted to the processing apparatus. Thereby, the teletext signal can be received, character data included in the teletext signal can be outputted to the personal computer for the purpose of various processes.

What is claimed is:

1. A character signal processing apparatus for processing a character signal transmitted as a multiplex signal with a television broadcast signal, the apparatus comprising:

input means for inputting said television broadcast signal and providing an input broadcast signal;

extracting means for extracting said character signal from the input broadcast signal using a predetermined first clock signal and outputting an extracted character data and the first clock signal;

interface means for outputting said extracted character data from said extracting means and said first clock signal to a personal computer, wherein said input means, extracting means and interface means are provided on a personal computer card, and wherein said input means includes means for inputting a video signal obtained by demodulating the television broadcast signal; and video decoding means for extracting an image signal from the video signal inputted by said means for inputting and for converting the extracted image signal into a digital image signal using a predetermined second clock signal to output said digital image signal and said second clock signal to said interface means, whereby said interface means outputs said digital image signal, said second clock signal, said character data, and said first clock signal to said personal computer.

2. The character signal processing apparatus as set forth in claim 1, wherein said input means inputs an audio signal obtained by demodulating the television signal, said character signal processing apparatus further comprising an A/D converter for converting said audio signal into a digital audio signal and outputs said digital audio signal to said interface means and said interface means outputs said digital audio signal, said digital image signal, said character data, and said clock signal to said personal computer.

3. A character signal processing system comprising a card including a circuit for processing a character signal transmitted as a multiplex signal with a broadcast signal and a personal computer to which said card is loaded, wherein said card includes input means for inputting said broadcast signal and providing an input broadcast signal, extracting means for extracting said character signal from the input broadcast signal using a predetermined first clock signal and outputting an extracted character data and said first clock signal, and first interface means for outputting said extracted character data outputted from said extracting means and said first clock signal to said personal computer, and said personal computer includes a second interface connected to said first interface when said card is loaded, character display signal generating means connected to said second interface via a bus to generate a character display signal corresponding to said character data transmitted from said card, a central processing unit (CPU) connected to said bus to control said card and said display signal generating means, and display means connected to said display signal generating means to display characters depending on said character display signal.

4. The character signal processing system as set forth in claim 3, wherein said broadcast signal is an FM broadcast signal.

5. The character signal processing system as set forth in claim 3, wherein said broadcast signal is a television broadcast signal.

6. The character signal processing system as set forth in claim 5, wherein said input means includes means for inputting a video signal obtained by demodulating the television broadcast signal.

7. The character signal processing system as set forth in claim 6, wherein said personal computer further comprises memory means connected to said bus to store conversion data, and said CPU converts the data transmitted from said card using said conversion data and the character display signal is generated by said display signal generating means.

8. The character signal processing system as set forth in claim 7, wherein said memory means is a hard disk.

9. A personal computer for processing a character signal transmitted as a multiplex signal with a broadcast signal, comprising:

a card interface to which is loaded a card including an input terminal for receiving an input broadcast signal, an extracting circuit for extracting said character signal from the input broadcast signal using a predetermined first clock signal and outputting extracted character data and said first clock signal, and an interface circuit for transmitting said extracted character data and said first clock signal from said card;

display signal generating means connected to said card interface via a bus to generate a character display signal corresponding to said character data transmitted from said card;

a central processing unit (CPU) connected to said bus to control said card and said display signal generating means; and display means connected to said display signal generating means to display characters depending on said character display signal.

10. The personal computer as set forth in claim 9 further comprising memory means connected to said bus to store conversion data, whereby said CPU converts the character data transmitted from said card using said conversion data to generate said character display signal by means of said display signal generating means.

* * * * *